United States Patent
Pfaff et al.

(10) Patent No.: US 6,294,010 B1
(45) Date of Patent: Sep. 25, 2001

(54) PIGMENT MIXTURE

(75) Inventors: Gerhard Pfaff, Münster; Sabine Schoen, Darmstadt, both of (DE); Kaiman Shimizu, Fukushima (JP)

(73) Assignee: Merck Patent Gesellschaft mit Beschrankter Haftung (DE)

( * ) Notice: Subject to any disclaimer, the term of this patent is extended or adjusted under 35 U.S.C. 154(b) by 0 days.

(21) Appl. No.: 09/471,269

(22) Filed: Dec. 23, 1999

(30) Foreign Application Priority Data

Dec. 23, 1998 (EP) .................................................. 98124475

(51) Int. Cl.$^7$ ....................................................... C04B 1/32
(52) U.S. Cl. ........................ 106/415; 106/417; 106/442; 106/483
(58) Field of Search ..................................... 106/415, 417, 106/483, 442

(56) References Cited

U.S. PATENT DOCUMENTS

| | | | |
|---|---|---|---|
| 5,441,564 | * | 8/1995 | Vogt ..................................... 106/417 |
| 5,672,200 | * | 9/1997 | Heinz et al. ......................... 106/415 |
| 5,702,519 | * | 12/1997 | Nitta et al. .......................... 106/442 |
| 5,749,946 | * | 5/1998 | Glausch et al. ..................... 106/415 |

* cited by examiner

*Primary Examiner*—C. Melissa Koslow
*Assistant Examiner*—Veronica F. Faison
(74) *Attorney, Agent, or Firm*—Millen, White, Zelano & Branigan, P.C.

(57) ABSTRACT

The present invention relates to pigment mixtures containing at least two components, component A being $Al_2O_3$ flakes coated with one or more metals, metal oxides and/or metal sulfides and component B being one or more functional pigments, such as electrically conductive pigments, magnetic pigments, IR-reflective pigments or lasermarkable pigments, and to their use in varnishes, paints, printing inks, plastics and powder coatings.

20 Claims, No Drawings

PIGMENT MIXTURE

SUMMARY OF THE INVENTION

The present invention relates to pigment mixtures containing at least two components, component A being $Al_2O_3$ flakes coated with one or more metals, metal oxides and/or metal sulfides and component B being one or more functional pigments such as electrically conductive pigments, magnetic pigments, IR-reflecting pigments or lasermarkable pigments and to their use in varnishes, paints, printing inks, plastics and powder coatings.

For various areas of application, use is made nowadays of electrically conductive pigments with which it is possible, for example, to produce antistatic coatings for electronic equipment, antistatic floor coverings, antistatic finishes for explosion-protected areas, or electrically conductive primers for the painting of plastics. Magnetic pigments can be used, for example, for magnetic coatings and IR-reflective pigments are applied, for example, for agricultural films. Other functional pigments are of interest as well. Functional pigments are all pigments for which physical properties other than the optical properties have the highest priority. Examples are electrically conductive pigments, magnetic pigments, IR-reflective pigments, or lasermarkable pigments.

To produce dark conductive pigments, use is currently made of carbon black, graphite and nickel-coated graphite, and to produce light-colored pigments, use is made of metal platelets and mixed oxides, such as antimony-doped tin oxide, for example. These mixed oxides can be in the form in which they have been deposited on carriers, examples being mica, $SiO_2$, glass or barium sulfate.

However, owing to their high light absorption in the visible spectral range, carbon black and graphite cannot be used for transparent, pale or colored coatings. A further problem is the strong absorption in the IR range, which leads to the frequently unwanted heating of the coated articles on exposure to sunlight, for example.

Metal platelets have the disadvantage that they are susceptible to corrosion and are non-transparent.

The inorganic oxides or mixed oxides employed to date, in the form of platelets with mica, for example, as carrier material, or in a form in which the dimensions in the three spatial directions are approximately equal, such as antimony-doped tin oxide without a carrier, require, as a result of their geometric form, relatively high use concentrations in order to exhibit a distinct effect.

The application of an additional layer to the pigment, however, implies a considerable additional expense in production and makes the product more expensive. In addition, the pigment has conductivity values which do not satisfy the high requirements.

In order to improve the conductivity of polymeric systems, such as plastics, paints or printing inks, for example, it is known from DE-A 42 12 950 to employ a pigment consisting of a component A, which consists of one or more conductive, platelet-shaped pigments, and a component B, which comprises one or more conductive, non-platelet-shaped pigments.

It has now surprisingly been found that a pigment mixture comprising coated $Al_2O_3$ flakes in combination with electrically conductive pigments has similar conductive properties as the conductive pigments alone together with a very attractive coloristic depth and glitter effect. Pigment mixtures of $Al_2O_3$ flake pigments with other functional pigments as magnetic or IR-reflective pigments lead to very effective combinations of coloristic and functional effects, too.

The invention hence provides a pigment mixture consisting of at least two components, component A and component B. Component A comprises $Al_2O_3$ flakes coated with one or more metals, metal oxides and/or metal sulfides. The $Al_2O_3$ flakes comprise platelet shaped $Al_2O_3$ substrates. Component B comprises one or more functional pigments as such as electrically conductive pigments, laser-markable pigments, particularly for the laser marking of paper or plastics, magnetic pigments or pigments with IR reflecting properties. The invention also contemplates the use of the pigments of the invention in formulations such as, for example, varnishes, paints, printing inks, plastics and powder coatings.

The invention likewise provides the formulations, such as paints, varnishes, powder coating materials, printing inks, plastics and agricultural films, which comprise the pigment mixture of the invention.

The coated $Al_2O_3$ flakes can be mixed in any proportion with the functional pigments. The preferred ratio of component A to component B is from 1:10 to 10:1, in particular from 1:2 to 2:1.

Aluminum oxide in a flaky form is commercially available for example from Merck KGaA under the tradename Xirallic®. $\alpha$-$Al_2O_3$ in the form of hexagonal flakes having a particle diameter greater than 10 $\mu$m and an aspect ratio (particle diameter/thickness) of 5–10 is known from JP 111239/1982 (Laid open No.).

The Japanese Patent Publication No. 72527/1991 discloses $\alpha$-$Al_2O_3$ in the form of flakes having an average particle diameter of 0.5–3 $\mu$m.

The JP 39362/1992 (Laid open No.) describes $Al_2O_3$ in the form of fine platy particles of a hexagonal crystal system with the plane perpendicular to the C axis grown into a plate.

Preferred $Al_2O_3$ flakes are flakes composed of aluminum oxide (as a major constituent) and of titanium dioxide (as a minor constituent) which are known from U.S. Pat. No. 5,702,519. These $Al_2O_3$ flakes are prepared from a uniform aqueous solution of water-soluble aluminum salt and titanium salt by hydrolysis with an alkali carbonate aqueous solution containing an alkali metal salt like alkali metal sulfate and phosphoric acid or phosphate, drying by evaporation (dehydration by heating), and molten-salt treatment.

The $Al_2O_3$ flakes are coated with one or more metal oxide layers. Examples of suitable metal oxides or metal oxide mixtures are titanium dioxide, zirconium oxide, zinc oxide, iron oxide ($Fe_2O_3$ and/or $Fe_3O_4$) and/or chromium oxide, especially $TiO_2$ and/or $Fe_2O_3$ as described in U.S. Pat. No. 5,702,519. Coating of the $Al_2O_3$ flakes with one ore more metal oxides may be accomplished by any known method such as hydrolysis of a metal salt by heating or alkali, which deposits hydrated metal oxide, followed by calcination.

$Al_2O_3$ flakes can also be coated with one or more layers of a metal or metal alloy selected from chromium, nickel, silver, bismuth, copper, tin or hastalloy.

$Al_2O_3$ flakes coated with a metal sulfide are coated with, for example, sulfides of tungsten, cerium, molybdenum, lanthanum or rare earth elements.

The $Al_2O_3$ flakes can be coated by wet chemical coating, by CVD or PVD processes. The metal coating on the $Al_2O_3$ flakes functions to increase the hiding power of the pigment.

The effect of component B shall be demonstrated using the example of conductive pigments. By the conductive pigments of component B are understood all pigments known to the skilled worker and comprising platelet-shaped, acicular or fiber-like carrier materials, such as mica, glass flakes, $SiO_2$ flakes, ceramic platelets, glass fibers, alumina fibers or titanium dioxide fibers that are coated with a conductive layer. It is also possible to use a carrier-free conductive pigment. Preferred conductive pigments of the invention have a powder resistance of less than about 10 kg ohm cm.

Also suitable in principle are carbon fibers, although in this case no additional conductive coatings are necessary since the fibers already possess sufficient conductivity. By acicular, fiber-like particles are meant those having a length-to-diameter ratio of more than 5. Suitable platelet-shaped pigments are known, for example, from EP 0 373 575.

The invention additionally provides paints, printing inks, plastics or powder coating materials that are pigmented with the pigment mixture of the invention. The proportion of the pigment mixture therein is from 1 to 80% by weight, preferably more than 2% by weight, based on the overall solid content of the system in which it is employed.

As a conductive layer on a carrier, particular suitability is possessed by aluminum-doped zinc oxide and by antimony-, halogen- and/or phosphorus-doped tin oxide or titanium dioxide.

The conductive layer is applied in a conventional manner in accordance, for example, with the process described in EP-A 0 139 557. In this process, it is possible to employ all customary conductive metal oxides and/or metal oxide mixtures. A selection of such materials is given in EP-A 0 139 557 on page 5, lines 5–19. Preference, however, is given to the application of a conductive layer of antimony-doped tin oxide which is applied in an amount of 25–100% by weight, in particular in an amount of 50–75% by weight, based on the platelet-shaped substrate.

In the case of the use of an aluminum-doped zinc-oxide layer, the proportion of the conductive layer is preferably from 40 to 200% by weight based on the carrier material, with proportions of from 100 to 200% by weight being employed with preference.

If the conductive layer consists of tin(IV) oxide or titanium dioxide doped with at least one halide, preferably fluoride, then the proportion of the conductive layer is from 20 to 200% by weight, preferably from 60 to 150% by weight, based on the carrier material. Pigments of this kind are known, for example, from DE-A 42 43 163. In the case of the conductive layer comprising phosphorus-doped tin oxide the proportion of the conductive layer is 25–100% by weight based on the substrate, especially 50–75% by weight. Pigments of this kind are known, for example, from DE-A 44 35 301. Larger quantities, although possible, do not bring about any further increase in the conductivity, and the pigments become increasingly darker.

In the case that the conductive pigment contains an antimony doped-tin dioxide layer, the tin/antimony ratio is preferably from 2:1 to 20:1, in particular from 5:1 to 10:1. If the content of antimony is too low, it is impossible to achieve a high conductivity. However, with a higher antimony content the pigments become increasingly darker.

Conductive, platelet-shaped pigments which can be assigned to component B of the pigment mixture of the invention are obtainable commercially under the tradename Minatec® (Merck KGaA, Darmstadt), and Zelec® ECP (DuPont). A product marketed under the tradename Minatec® CM 31 consists of mica flakes coated with antimony-doped tin dioxide. Under the tradename Minatec® CM 30 a conductive pigment is marketed which consists of titanium dioxide-coated mica and which possesses as a conductive layer an antimony-doped tin dioxide layer.

The combination of $Al_2O_3$ flake pigments with conductive, platelet-shaped and/or acicular particles leads to conductive products whose electrical properties are similar as those of a conductive pigment alone. The advantages become particularly distinct in the system in which the pigments are used, especially in the case of their incorporation into plastics. The use concentrations required for the pigment mixture of the invention in the plastic (pigment volume concentration) are similar as in the case of conventional conductive pigments. This is advantageous because of the very interesting coloristic effects which can be simultaneously achieved by using the mixture of the conductive pigments together with the $Al_2O_3$ pigments. The use specifically of fiber-like conductive pigments frequently also leads to an additional stabilisation of the mechanical properties of the plastic.

Comparable advantageous effects can be achieved by the combination of interesting coloristics of $Al_2O_3$ flake pigments with the physical properties of functional pigments such as magnetic or IR-reflective pigments.

The pigment mixture of the invention is simple and easy to handle. The pigment mixture can be incorporated into the system in which it is used by simple stirring. Laborious milling and dispersing of the pigments is unnecessary.

The pigment mixture of the invention can be used for pigmenting coating materials, printing inks, plastics, agricultural films, for coating seed or for coloring foods. The concentration of the pigment mixture in the system in which it is used for pigmenting is in general between 0.01 and 50% by weight, preferably between 0.1 and 10% by weight, based on the overall solids content of the system. This concentration is generally dependent on the specific application.

Plastics comprising metal oxide coated $Al_2O_3$ flakes in combination with conductive pigments in amounts of 0.1 to 50% by weight, in particular from 0.5 to 7% by weight, are frequently notable for a particular sparkle effect.

Plastics which comprise the pigment mixture of the invention in amounts of from 0.1 to 10% by weight are, moreover, highly suited to laser marking. The marking operations carried out, for example, with a $CO_2$ or Nd-YAG laser, lead to sharply defined, abrasion-resistant markings.

In the coatings sector, the pigment mixture is employed in amounts of 5–35% by weight. The proportion in which the coated $Al_2O_3$ flakes are mixed with component B depends on the desired effect. The $Al_2O_3$ flakes are preferably employed with component B in a ratio of 1:5, especially 1:3. In the coating material, the pigment mixture of the invention has the advantage that the desired color flop effect is obtained by a single-coat finish. This color flop is extremely pronounced. In comparison with coatings which comprise an interference pigment based on mica rather than the coated $Al_2O_3$ flakes, coatings with the pigment mixture of the invention exhibit a marked depth effect and a glitter effect.

In the pigmentation of binder systems, for example, for paints and printing inks for intaglio, offset or screen printing, pigment mixtures consisting in particular of coated $Al_2O_3$ flakes with Minatec® (Merck KGaA, Darmstadt) have been found particularly suitable. The pigment mixture is incorporated into the printing ink in amounts of 2–35% by weight, preferably 5–25% by weight and, in particular, 8–20% by weight. The mixing ratio of component A to component B is preferably in the range from 1:5 to 5:1. The printing inks comprising the pigment mixture of the invention exhibit purer hues and are of improved printability owing to the good viscosity values.

The invention hence also provides formulations containing the pigment mixture of the invention.

In the foregoing and in the following examples, all temperatures are set forth uncorrected in degrees Celsius; and, unless otherwise indicated, all parts and percentages are by weight.

The entire disclosure of all applications, patents and publications, cited herein are hereby incorporated by reference. Particularly, this application claims priority to European Patent Application 98124475.9, the entire text of which is hereby incorporated by reference. Additionally, U.S. patent application Ser. Nos. 09/471,331, 09/471,004 and 09/471,330 are hereby incorporated by reference.

EXAMPLES

Example 1—Intaglio Printing Ink consisting of:
70 g nitrocellulose-based binder from Gebrüder Schmidt, 95MB011, with a solids content of 20%
15 g Minatec® 31 CM (conductive pigment from Merck KGaA, Darmstadt, FRG)
15 g $TiO_2$ coated $Al_2O_3$ flakes with a particle size of 5 to 60 μm
30 g 1-ethoxy-2-propanol Example 2—Plastic Polyethylene (PE-HD) granules (1 kg) are uniformly wetted in a tumble mixer with 2 g of adhesion agent. Then 10 g of $TiO_2$ coated $Al_2O_3$ flakes of particle size 5–60 μm and 2 g of Iriodin® LS 825 (conductive pigment from Merck KGaA, Darmstadt, FRG) with a particle size<15 μm are added. The components are mixed for 2 minutes.

These granules are processed under conventional conditions on an injection moulding machine to give small stepped plates measuring 4×3×0.5 cm. The small stepped plates are notable for their luster and their laser markability.

Example 3—Coating Material 30 g $TiO_2$ coated $Al_2O_3$ flakes of particle size 5–60 μm (Merck KGaA)
10 g Minatec® 40 CM (conductive pigment from Merck KGaA)
42 g paint base (AU-MF system, solids=19%)
18 g diluent mixture The coating features antistatic properties and a color flop from pale lilac to pale green.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A pigment mixture comprising a component A and a component B, wherein component A comprises $Al_2O_3$ flakes coated with one or more metals, metal oxides or metal sulfides, and wherein component B comprises one or more functional pigments.

2. A pigment mixture according to claim 1, wherein component A comprises $Al_2O_3$ flakes coated with $TiO_2$, $Fe_2O_3$, or a combination of $TiO_2$ and $Fe_2O_3$.

3. A pigment mixture according to claim 1, wherein component B comprises an electrically conductive pigment, a magnetic pigment, an IR-reflective pigment, a lasermarkable pigments, or a mixture thereof.

4. A pigment mixture according to claim 2, wherein component B comprises an electrically conductive pigment, a magnetic pigment, an IR-reflective pigment, a lasermarkable pigments, or a mixture thereof.

5. A pigment mixture according to claim 3, wherein component B comprises at least one electrically conductive pigment.

6. A pigment mixture according to claim 4, wherein component B comprises at least one electrically conductive pigment.

7. A pigment mixture according to claim 5, wherein the electrically conductive pigment comprises $SiO_2$ flakes or mica platelets coated with one or more metal oxides and comprising a tin dioxide conductive layer, wherein the tin-dioxide conductive layer is doped with at least one of antimony, halogen or phosphorus.

8. A pigment mixture according to claim 5, wherein the electrically conductive pigment comprises $SiO_2$ flakes or mica platelets coated with one or more metal oxides and comprising a tin dioxide conductive layer, wherein the tin-dioxide conductive layer is doped with antimony, and wherein the tin/antimony ratio in the tin-dioxide conductive layer is from 5:1 to 10:1.

9. A pigment mixture according to claim 6, wherein the electrically conductive pigment comprises $SiO_2$ flakes or mica platelets coated with one or more metal oxides and comprising a tin dioxide conductive layer, wherein the tin-dioxide conductive layer is doped with at least one of antimony, halogen or phosphorus.

10. A pigment mixture according to claim 6, wherein the electrically conductive pigment comprises $SiO_2$ flakes or mica platelets coated with one or more metal oxides and comprising a tin dioxide conductive layer, wherein the tin-dioxide conductive layer is doped with antimony, and wherein the tin/antimony ratio in the tin-dioxide conductive layer is from 5:1 to 10:1.

11. A pigment mixture according to claim 1, wherein component A and component B are mixed in a ratio of from 10:1 to 1:10.

12. A pigment mixture according to claim 2, wherein component A and component B are mixed in a ratio of from 10:1 to 1:10.

13. A pigment mixture according to claim 5, wherein component A and component B are mixed in a ratio of from 10:1 to 1:10.

14. A method of manufacturing a pigment formulation comprising providing a pigment mixture according to claim 1 and adding the pigment mixture to a formulation to obtain a paint, a varnish, a printing ink, a plastic, a formulation for coloring seed, or formulation for laser marking.

15. A method of manufacturing a pigment formulation comprising providing a pigment mixture according to claim 2 and adding the pigment mixture to a formulation to obtain a paint, a varnish, a printing ink, a plastic, a formulation for coloring seed, or formulation for laser marking.

16. A pigment formulation comprising a pigment mixture according to claim 1, wherein the pigment formulation is a paint, a varnish, a printing ink, a plastic, a formulation for coloring seed, or a formulation for laser marking.

17. A pigment formulation comprising a pigment mixture according to claim 2, wherein the pigment formulation is a paint, a varnish, a printing ink, a plastic, a formulation for coloring seed, or a formulation for laser marking.

18. A pigment formulation comprising of from 0.1 to 10% of a pigment mixture according to claim 1, wherein the pigment formulation is a plastic.

19. A pigment formulation comprising of from 0.1 to 10% of a pigment mixture according to claim 2, wherein the pigment formulation is a plastic.

20. A pigment formulation comprising of from 8–20% of a pigment mixture according to claim 1, wherein the pigment formulation is a printing ink.

* * * * *